United States Patent [19]
Lagnemo et al.

[11] Patent Number: 5,846,922
[45] Date of Patent: *Dec. 8, 1998

[54] BLEACHING AGENT

[75] Inventors: Hans Lagnemo, Göteborg; Monica Jigstam, Torslanda, both of Sweden

[73] Assignee: Eka Chemicals AB, Bohus, Sweden

[*] Notice: The term of this patent shall not extend beyond the expiration date of Pat. No. 5,827,811.

[21] Appl. No.: 700,415

[22] PCT Filed: Jan. 30, 1995

[86] PCT No.: PCT/SE95/00085

§ 371 Date: Aug. 23, 1996

§ 102(e) Date: Aug. 23, 1996

[87] PCT Pub. No.: WO95/23210

PCT Pub. Date: Aug. 31, 1995

[30] Foreign Application Priority Data

Feb. 25, 1994 [SE] Sweden ................................. 9400653
Oct. 7, 1994 [SE] Sweden ................................. 9403408

[51] Int. Cl.⁶ .......................... C11D 3/39; C01B 15/10
[52] U.S. Cl. ..................... 510/375; 8/111; 252/186.27; 252/186.43; 252/186.25
[58] Field of Search ............... 252/186.27, 187.28, 252/186.29, 186.31, 186.32, 186.41, 186.43; 8/111; 510/375, 441; 423/224, 275, 415.2; 428/402, 403

[56] References Cited

U.S. PATENT DOCUMENTS

| | | |
|---|---|---|
| 3,975,280 | 8/1976 | Hachmann et al. . |
| 3,977,988 | 8/1976 | Tokiwa et al. . |
| 4,075,116 | 2/1978 | Mesaros . |
| 4,117,087 | 9/1978 | Dillenburg et al. . |
| 5,264,143 | 11/1993 | Boutique ................................. 510/306 |
| 5,340,496 | 8/1994 | Sato et al. . |

FOREIGN PATENT DOCUMENTS

| | | |
|---|---|---|
| 459625 | 12/1991 | European Pat. Off. . |
| 550077 | 1/1992 | European Pat. Off. . |
| 546815 | 6/1993 | European Pat. Off. . |
| 567140 | 10/1993 | European Pat. Off. . |
| 573731 | 12/1993 | European Pat. Off. . |
| 53-959 | 1/1978 | Japan . |
| 58-74508 | 5/1983 | Japan . |
| 1-98699 | 8/1989 | Japan . |
| 659082 | 12/1986 | Switzerland . |
| 1575792 | 1/1978 | United Kingdom . |
| 2016540 | 9/1979 | United Kingdom . |
| 1579513 | 11/1980 | United Kingdom . |
| 9115423 | 10/1991 | WIPO . |
| 9518065 | 7/1995 | WIPO . |
| 95 25065 | 9/1995 | WIPO . |

OTHER PUBLICATIONS

RoMPPS Chemie–Lexikon, Upplaga 8, Band 2, 1981, p. 1503, "Gluconsaure".

Kirk–Othmer Encyclopedia of Chemical Technology, Third Edition, vol. 5, p. 344.

*Primary Examiner*—Margaret Einsmann
*Attorney, Agent, or Firm*—McDermott, Will & Emery

[57] ABSTRACT

The invention relates to particles having a core comprising a peroxy compound with capability of releasing hydrogen peroxide or peroxy acids in aqueous solutions, which particles have a coating containing a chelating agent selected from alkali metal salts or alkaline earth metal salts of a hydroxy carboxylic acid satisfying the formula: $RC_nH_m(OH)_nCOOH$ in which R is $CH_2OH$ or COOH, n is 2–6 and m is 0–n. The invention also relates to preparation and use of the particles, as well as a composition containing such particles.

29 Claims, No Drawings

BLEACHING AGENT

The present invention relates to particles having a core of a peroxy compound with capability of releasing hydrogen peroxide or peroxy acids in aqueous solutions and a coating comprising a chelating agent selected from salts of hydroxy carboxylic acids. The invention also relates to preparation and use of the particles. Further, the invention relates to a composition containing such coated particles.

Powder detergent compositions often contain peroxy compounds as bleaching agents which release hydrogen peroxide or peroxy acids in aqueous solutions. However, many peroxy compounds are not storage stable. Their decomposition is supposed to be catalysed by metal cations moving comparatively freely through the water normally being present in detergents, but is also facilitated by the alkaline pH (normally from about 8 to about 12) and by other components commonly present in detergents, for example zeolites or bleaching activators such as TAED (tetraacetylethylene diamine), TAGU (tetraacetylglucoluril) or PAG (penta acetyl glucose).

In order to make environmental friendly detergents, it is desirable to use alkali metal carbonate peroxy hydrate, known as percarbonate, as a bleaching agent. However, the activity of percarbonate in a detergent decreases rapidly through decomposition if the detergent is stored at normal room temperature and humidity.

Many attempts to stabilize percarbonate have been done, for example by mixing or coating with stabilizing substances such as borates, silicates or organic substances. Such stabilizing methods are described in the patent literature, for example in GB 1575792, EP 459625, U.S. Pat. No. 3,975,280 and EP 573731.

It has also been disclosed to combine percarbonate with chelating agents such as alkali metal citrate (see EP 546815) or phosphonic acids (see WO 91/15423).

CH 659082 describes a detergent additive comprising a mixture of a peroxide, an inorganic carbonate and an acid or its salt. The additives facilitate the dissolution of the bleaching agent.

U.S. Pat. No. 4,075,116 discloses a method of preparing sodium percarbonate from sodium carbonate and hydrogen peroxide, which method includes adding a compound selected from sodium sulfate, potassium sulfate, sodium pyrophosphate, potassium pyrophosphate, sodium metasilicate, sodium disilicate, sodium citrate, sodium glucoheptonate, sodium perborate, anhydrous sodium carbonate, potassium carbonate and mixed sodium and potassium carbonate. However, the patent is not addressed towards stabilization of previously prepared sodium percarbonate or to the inhibition of the other constituents of detergent mixtures containing percarbonate.

The main object of the present invention is to provide particles comprising a peroxy compound, particularly alkali metal percarbonate, with improved storage stability, particularly in detergent compositions. It is another object of the invention to provide particles comprising a peroxy compound only containing environmental friendly constituents.

Through the present invention, these objects have been fulfilled by providing particles having a core of a peroxy compound with capability of releasing hydrogen peroxide or peroxy acids in aqueous solutions, particularly in alkaline solutions. The particles have a coating containing a chelating agent selected from alkali metal salts or alkaline earth metal salts of a hydroxy carboxylic acid satisfying the formula:

$$RC_nH_m(OH)_nCOOH$$

in which R is $CH_2OH$ or COOH, n is 2–6, and m is 0–n.

It has surprisingly been found that hydroxy carboxylic acids according to the above formula gives superior storage stability compared to conventional chelating agents such as phosphonic acids, citrate or EDTA (ethylene diamine tetra acetic acid), at the same time as they are easily biodegradable and therefore environmental friendly. It is preferred that chelating agents not being so easily degradable, such as phosphonic acids, phosphonates and EDTA, are not included in the particles. Further, is has been found that the chelating agent is much more effective when it is applied as a coating then if it is mixed in the core. However, the most effective stabilization occurs when also the core contains a chelating agent according to the formula above.

The invention is particularly advantageous if the peroxy compound is alkali metal percarbonate, but also other peroxy compounds can be stabilized, for example alkali metal salts of perborates, peroxysulfates, peroxyphosphates or peroxysilicates, peroxycarboxylic acids or peroxycarboxylic acid releasing compounds such as di-acylated di-peroxy carboxylic acids (see WO 91/17143). The particles preferably contains from about 10 to about 99% by weight, most preferably from about 50 to about 95% by weight of a peroxy compound, and from about 0.1 to about 20% by weight, most preferably from about 0.5 to about 15% by weight of a chelating agent. It is particularly preferred that the chelating agent in the coating constitutes from about 0.1 to about 15% by weight, most preferably from about 5 to about 10% by weight of the particle, and that the optional chelating agent in the core constitutes from about 0.1 to about 10% by weight, most preferably from about 0.2 to about 5% by weight of the particle. Preferably from about 50 to about 100% by weight of the total amount of the chelating agent is in the coating of the particle.

The alkali metals in the chelating agent are preferably selected from sodium, potassium or mixtures thereof. Alkaline earth metals agent are preferably selected from calcium, magnesium or mixtures thereof. Preferred chelating agent are alkali metal salts of hydroxy carboxylic acids according to the above formula. Preferably R is $CH_2QH$. It is also preferred that n is 4 or 5. Preferably, m is equal to n or n−2, the carbon chain thus being saturated or containing one double bond. A particularly preferred chelating agent is alkali metal glucoheptonate which is the alkali metal salt of the compound according to the above formula when R is $CH_2OH$ and n is 5. Other preferred chelating agents are alkali metal gluconate (R is $CH_2OH$, n and m are 4) and alkali metal ascorbate (R is $CH_2OH$, n is 4 and m is 2). Other useful chelating agents include, for example, salts of trihydroxy glutaric acid, tartaric acid or saccharic acid. It is to be understood that the particles may include two or more different chelating agents of the above formula. The particles may also include other environmentally acceptable chelating agents.

It has surprisingly been found that a synergistic effect in respect of storage stability occurs when the particles contains a chelating agent of the above formula and an alkali metal silicate. The stabilizing effect has been found to be particularly good if the molar ratio $SiO_2:M_2O$, M being an alkali metal, is from 1 to 3, especially from 1.5 to 2.5. The alkali metal is preferably sodium, potassium or mixtures thereof. Preferably, at least the core of the particles contain alkali metal silicate, suitably in an amount from about 0.1 to about lo by weight, preferably from about 0.5 to about 7% by weight of the particle. It is particularly preferred that the core contains both alkali metal silicate and a chelating agent. Most preferably, also the coating contains alkali metal silicate, suitably in an amount from about 0.1 to about 10 % by weight, preferably from about 0.5 to about 5% by weight of the particle.

The particles may comprise one or several layers containing a chelating agent and optionally alkali metal silicate. The particles may also comprise additional layers not containing chelating agents or alkali metal silicate.

A synergistic effect in respect of storage stability has also been found between chelating agents according to the invention and anhydrous alkali metal carbonate. Thus, the stability is improved if the core of the particles contain anhydrous alkali metal carbonate, particularly sodium carbonate, (commonly known as soda ash), suitably in an amount from about 1 to about 50% by weight, preferably from about 5 to about 30% by weight of the particle. It is also possible to include other substantially inert substances such as sulfates or phosphates of alkali metals.

Suitably, the particles have an average diameter from about 50 to about 3000 μm, preferably from about 100 to about 1250 μm. The preferred density is from about 600 to about 1500 g/l, particularly from about 800 to about 1100 g/l. It has been found that a high density as well as a high average particle size improves the storage stability.

The invention also concerns a method of preparing particles according to the invention, which method comprises the steps of applying a coating on particles comprising a peroxy compound with capability of releasing hydrogen peroxide or peroxy acids in aqueous solutions, which coating contains a chelating agent selected from alkali metal salts or alkaline earth metal salts of a hydroxy carboxylic acid satisfying the formula:

$$RC_nH_m(OH)_nCOOH$$

in which R is $CH_2OH$ or COOH, n is 2–6 and m is 0–n. Preferably, the coating also contains alkali metal silicate. The particles comprising the peroxy compound, preferably also contain a chelating agent according to the above formula and alkali metal silicate. Such particles may for example be prepared from fine particles mainly consisting of a peroxy compound, preferably with a particle diameter less than about 200 μm, adding a chelating agent and/or alkali metal silicate and/or other optional ingredients, and granulating the mixture to obtain particles of a suitable size, which particles then can be coated. A chelating agent, alkali metal silicate and other optional ingredients can also be included directly when, for example, alkali metal percarbonate prepared is produced from alkali metal carbonate and hydrogen peroxide. Alkali metal silicate is preferably added in the form of an aqueous solution, and the chelating agent is preferably mixed therein before addition to the peroxy compound. Regarding preferred peroxy compounds, chelating agents, alkali metal silicate and other components, as well as suitable amounts thereof, the above description of the particles according to the invention is referred to.

Granulation may be performed by conventional methods well known among those skilled in the art, such as compacting, extruding, agglomeration in drum or disk, fluid-bed granulation, prilling or in different kinds of mixers. Also the coating may performed by conventional methods such as spraying in drums or fluidized beds.

The invention further concerns use of the described particles comprising a peroxy compound and a chelating agent as a bleaching agent, preferably in connection with washing of textiles or dishwashing. The washing water may be supplied with particles according to the invention being included in a detergent composition or being in the form of a separate bleaching powder. Preferably, washing water is supplied with particles in an amount so to obtain from about 0.001 to about 1 gram active oxygen per liter, which for example corresponds to from about 0.01 to about 6 grams sodium percarbonate.

Finally, the invention concerns a composition containing an inert filler, and/or one or several substances active at washing, which composition further contains particles comprising a peroxy compound and a chelating agent according to the invention, for example in an amount from about 1 to about almost 100% by weight. The composition may comprise a mixture of particles containing different kinds of peroxy compounds. The substances active at washing may include detergent builders, surfactants, alkali generating substances, bleaching activators, or any other substances commonly used in detergents. The detergent builder may for example be selected from phosphates, zeolites, polycarboxylates, citrates, crystalline disilicates, amorphous disilicates (e.g. Britesil™), or mixtures thereof. The surfactants are preferably selected from anionic surfactants, nonionic surfactants, soaps or mixtures thereof. Anionic surfactants may for example be selected from linear alkylbenzene sulfonates, secondary alkane sulfonates, alcoholethoxysulfates or alpha-olefine sulfonates. Nonionic surfactants may for example be selected from alkoxylated compounds such as fatty alcohols, alkylphenols and alkylamines. Soaps may for example be selected from sodium or potassium salts of tallow. Also cationic surfactants such as quaternary ammonium compounds or imide azolinium salts, as well as amphoteric surfactants might be used. Alkali generating substances may for example be selected from carbonates, silicates, phosphates or mixtures thereof. The bleaching activators may for example be selected from TAED, TAGU, SNOBS (sodium nonoyl benzene sulfonate), PAG (penta acetyl glucose) or diacylated diperoxy carboxylic acids (see WO 91/17143). The filler may include any inert substance such as sodium sulfate. The composition may constitute a complete detergent or a bleaching powder to be added separately at washing.

A complete detergent for washing of textiles suitably contains from about 1 to about 30% by weight, preferably from about 10 to about 20% by weight of particles according to the invention. Further, the detergent suitably contains a detergent builder, for example from about 5 to about 50% by weight, surfactants, for example from about 5 to about 35% by weight and an alkali generating substance, for example from about 5 to about 20% by weight. Preferably, the detergent contains from about 5 to about 20% by weight of anionic surfactants, from about 2 to about 15% by weight of nonionic surfactants, and from about 0.1 to about 5% by weight of soaps. The detergent may also contain bleaching activators, for example from about 1 to about 10% by weight, and fillers such as sodium sulfate, for example from about 5 to about 50% by weight. Although not preferred from an environmental point of view, it is possible to include chelating agents such as phosphonates or EDTA, for example in an amount from about 0.1 to about 1% by weight. Additionally, the detergent may contain conventional components such as water glass, carboxy methyl cellulose, enzymes, foam regulators, perfumes, colouring agents, optical brighteners and water. The detergent can be prepared with conventional methods such as dry mixing, agglomeration or spray drying. If the preparation involves spray drying, any heat sensible component such as particles comprising peroxy compounds, enzymes and perfumes should be added to the dried material.

A separate bleaching powder may comprise up to almost 100% by weight of particles containing peroxy compounds according to the invention, but preferably the content is from about 5 to about 90 by weight. The bleaching powder may comprise only one peroxy compound or a mixture of particles containing different kinds of peroxy compounds. It is advantageous if a hydrogen peroxide generating substance such as percarbonate, for example from about 10 to about 75% by weight, is used in combination with a bleaching activator such as TAED or TAGU, for example from about 2 to about 25% by weight. Also other bleaching activators such as a diacylated divercarboxylic acid may be used, for example in an amount from about 2 to about 25% by weight. A bleaching powder may also contain detergent builders, for example from about 5 to about 90% by weight, surfactants, for example up to about 10% by weight, enzymes, for example up to about 2% by weight, or fillers, for example from about 5 to about 90% by weight. A preferred bleaching powder consists essentially of from about 30 to about 75% by weight of particles containing percarbonate, from about 10 to about 25% by weight of a bleaching activator, the balance preferably substantially being detergent builders, fillers, surfactants, water or mixtures thereof.

A detergent for dishwashing may be in the form of a low alkaline detergent (pH of washing water intended to be about 10–11) suitably containing from about 2 to about 15% by weight of a bleaching agent comprising coated particles according to the invention, such as coated sodium percarbonate, from about 5 to about 50% by weight of alkali metal disilicate, from 0 to about 40% by weight of alkali metal carbonate, from about 15 to about 50% by weight of builders such as sodium citrate and polycarboxylates or sodium tri polyphosphate (STPP), from about 0.5 to about 5% by weight of low foaming nonionic surfactants, from about 0.5 to about 5% by weight of enzymes and from about 1 to about 6% by weight of bleaching activators such as TAED. A dishwasher detergent may also be high alkaline (pH of washing water intended to be about 11–12) having a similar composition as the low alkaline detergent, the disilicate however being replaced with from about 20 to about 809% by weight of alkali metal meta silicate and the builder preferably substantially consisting of STPP.

The present invention makes it possible to prepare stable bleaching agents comprising peroxy compounds, particularly percarbonate, which may be used in detergents including zeolites such as zeolite 4A. The invention also makes it possible to decrease or exclude the use of other chelating agents in detergents, such as the commonly used EDTA or phosphonates which are less suitable from an environmental point of view.

The invention will now be described through the following examples which, however, not are intended to limit the scope of the invention. If not otherwise stated, all contents an percentages refer to content and percent by weight.

EXAMPLE 1

Sodium percarbonate particles with a diameter of about 315–1250 $\mu$m and a density of about 1000 g/l were coated with different chelating agents and optionally with aqueous sodium disilicate solution by spraying in a rotating drum and drying in a fluidized bed. Particles according to the invention were prepared by coating with sodium glucoheptonate and sodium gluconate. Particles for comparison were prepared by coating with sodium citrate, Dequest® 2016 (1-hydroxyethylidene (1,1-diphosphonic acid) tetra sodium salt) and disodium EDTA. In order to test the storage stability of the percarbonate, the prepared particles as well as uncoated particles were included in a standard detergent IEC-Z (Henkel) consisting of 9.7% linear alkyl benzene-sulfonate ($C_{average}$11.5) 5.2% ethoxylated $C_{12-18}$alcohol (EO$_7$) 3.6% sodium-soap, 32.5% zeolite A, 13.0% sodium carbonate, 5.2% sodium salt of copolymerisate of acrylic- and maleic acid (CP$_5$), 3.9% sodium waterglass (ratio 3.3), 1.3% carboxy methyl cellulose, 0.3% EDTA, 0.3% optical brightener (stilbene type), 24.4% sodium sulfate, water and foam regulator, 0.6% enzyme prills protease (activity 300.00). Samples were prepared from 64 grams IEC-Z, 12 grams percarbonate particles and 4 grams TAED. A Quick Stability Index (QSI) was determined for each sample by measuring the amount of oxygen formed during 24 hours storage at 40° C. and dividing the amount oxygen liberated by the relative content (%) of active oxygen in the original percarbonate. Thus, a low QSI-value means high stability. The results appear in the table below, in which the contents of the different constituents refer to % by weight based on the entire particle. The following abbreviations are used: PC=sodium percarbonate; SI=sodium disilicate; C sodium citrate; D=Dequest® 2016; E=disodium EDTA; GH=sodium glucoheptonate; G=sodium gluconate; AO=active oxygen; QSI=quick stability index.

| PC  | SI | C | D | E | GH | G | AO   | QSI |
|-----|----|----|----|----|----|----|------|-----|
| 100 | 0  | 0 | 0 | 0 | 0  | 0 | 14.8 | 3.1 |
| 95  | 0  | 5 | 0 | 0 | 0  | 0 | 13.9 | 1.5 |
| 95  | 0  | 0 | 0 | 0 | 0  | 5 | 14.1 | 0.9 |
| 95  | 0  | 0 | 0 | 0 | 5  | 0 | 13.9 | 0.8 |
| 93  | 2  | 0 | 5 | 0 | 0  | 0 | 14.1 | 0.9 |
| 93  | 2  | 0 | 0 | 5 | 0  | 0 | 14.1 | 1.2 |
| 93  | 2  | 0 | 0 | 0 | 5  | 0 | 13.8 | 0.3 |
| 91  | 2  | 0 | 0 | 0 | 7  | 0 | 13.5 | 0.2 |
| 95  | 5  | 0 | 0 | 0 | 0  | 0 | 14.0 | 1.4 |
| 95  | 0  | 0 | 0 | 0 | 5  | 0 | 13.9 | 0.8 |
| 93  | 2  | 0 | 0 | 0 | 5  | 0 | 13.8 | 0.3 |

EXAMPLE 2

Sodium percarbonate particles with a diameter of about 315–1250 $\mu$m and a density of about 900 g/l were prepared by granulation from fine percarbonate particles in a rotating Eirich drum together with aqueous sodium disilicate solution and/or sodium glucoheptonate and/or anhydrous sodium carbonate (soda ash). The particles were subsequently dried in a fluidized bed and were then optionally coated with sodium glucoheptonate and/or aqueous sodium disilicate solution in the same way as in Example 1. All additives were premixed before addition to the percarbonate. The stability of the percarbonate in a standard detergent was determined in the same way as in Example 1. The results appear in the table below. In the case the content of an ingredient is indicated with two numbers, the first one refers to the content in the core and the second one to the content in the coating. As in Example 1, all contents are given in % by weight based on the total weight of the particle. The same abbreviation as in Example 1 are used. Additionally, S stands for soda ash.

| PC | S  | SI    | GH    | AO   | QSI  |
|----|----|-------|-------|------|------|
| 76 | 15 | 2 + 2 | 0 + 5 | 11.0 | 0.1  |
| 78 | 15 | 2 + 0 | 5 + 0 | 10.9 | 1.1  |
| 93 | 0  | 2 + 2 | 0 + 3 | 13.1 | 1.1  |
| 95 | 0  | 2 + 0 | 3 + 0 | 13.5 | 1.8  |
| 89 | 0  | 2 + 2 | 0 + 7 | 12.8 | 0.5  |
| 74 | 15 | 2 + 2 | 0 + 7 | 10.7 | <0.1 |
| 91 | 0  | 2 + 2 | 0 + 5 | 13.1 | 1.1  |
| 76 | 15 | 2 + 2 | 0 + 5 | 11.0 | <0.1 |
| 83 | 15 | 2 + 0 | 0     | 12.0 | 2.5  |
| 91 | 0  | 2 + 2 | 1 + 4 | 13.0 | 0.6  |

| PC | S | SI | GH | AO | QSI |
|----|---|----|----|----|-----|
| 91 | 0 | 2 + 2 | 0 + 5 | 13.1 | 1.1 |
| 89 | 0 | 2 + 2 | 1 + 6 | 12.7 | <0.1 |
| 89 | 0 | 2 + 2 | 0 + 7 | 12.8 | 0.5 |

We claim:

1. Particles each comprising a core including a peroxy compound capable of releasing hydrogen peroxide or peroxy acids in aqueous solution and a coating over the core containing a chelating agent selected from the group consisting of an alkali metal salt, an alkaline earth metal salt and mixtures thereof of a hydroxycarboxylic acid having the formula $$RC_nH_m(OH)_nCOOH$$

wherein R is $CH_2OH$ or COOH, n is 4 or 5 and m is 0–n.

2. Particles as claimed in claim 1, wherein the particles contain from about 0.1 to about 20% by weight of the chelating agent.

3. Particles as claimed in claim 1, wherein the chelating agent is an alkali metal salt of the hydroxy carboxylic acid, and that R is $CH_2OH$, n is 4 or 5 and m is equal to n or n−2.

4. Particles as claimed in claim 1, wherein the chelating agent is an alkali metal glucoheptonate.

5. Particles as claimed in claim 1, wherein the chelating agent is an alkali metal ascorbate.

6. Particles as claimed in claim 1, wherein the peroxy compound is alkali metal percarbonate.

7. Particles as claimed in claim 1, wherein the core of the particles further contains alkali metal silicate.

8. Particles as claimed in claim 1, wherein the coating further contains alkali metal silicate.

9. Particles as claimed in claim 7, wherein in said silicate the molar ratio $SiO_2:M_2O$, M being an alkali metal, is from 1 to about 2.5.

10. Particles as claimed in claim 1, wherein the core of the particles contains anhydrous alkali metal carbonate.

11. A particle comprising a peroxy compound capable of releasing hydrogen peroxide or peroxy acids in aqueous solution and mixed with an alkali metal silicate and a chelating agent selected from the group consisting of an alkali metal salt, an alkaline earth metal salt and mixtures thereof of a hydroxycarboxylic acid having the formula $$RC_nH_m(OH)_nCOOH$$

wherein R is $CH_2OH$, n is 2–6 and m is 0–n.

12. Particles as claimed in claim 11, wherein the chelating agent is sodium glucoheptonate.

13. Particles as claimed in claim 11, wherein the peroxy compound is sodium percarbonate.

14. Particles as claimed in claim 11, wherein the particles contain from about 0.1 to about 10% by weight of alkali metal silicate and from about 0.1 to about 10% by weight of the chelating agent.

15. Particles as claimed in claim 11, wherein the chelating agent is an alkali metal salt of the hydroxy carboxylic acid, and that R is $CH_2OH$, n is 4 or 5 and m is equal to n or n−2.

16. Particles as claimed in claim 15, wherein the chelating agent is an alkali metal glucoheptonate.

17. Particles as claimed in claim 11, wherein the peroxy compound is alkali metal percarbonate.

18. A method for preparing particles comprising mixing a peroxy compound capable of releasing hydrogen peroxide or peroxy acids in aqueous solution, with alkali metal silicate and a chelating agent selected from the group consisting of an alkali metal salt, an alkaline earth metal salt and mixtures thereof of a hydroxycarboxylic acid having the formula $$RC_nH_m(OH)_nCOOH$$

wherein R is $CH_2OH$, n is 2–6 and m is 0–n.

19. A method as claimed in claim 18, wherein the chelating agent is an alkali metal salt of the hydroxy carboxylic acid, and that R is $CH_2OH$, n is 4 or 5 and m is equal to n or n−2.

20. A method as claimed in claim 18, wherein the chelating agent is an alkali metal glucoheptonate.

21. Particles each comprising a core including a peroxy compound capable of releasing hydrogen peroxide or peroxy acids in aqueous solution and a coating over the core containing alkali metal silicate and a chelating agent selected from the group consisting of an alkali metal salt, an alkaline earth metal salt and mixtures thereof of a hydroxycarboxylic acid having the formula $$RC_nH_m(OH)_nCOOH$$

wherein R is $CH_2OH$ or COOH, n is 2–6 and m is 0–n.

22. Particles each comprising a core including a peroxy compound capable of releasing hydrogen peroxide or peroxy acids in aqueous solution, and a coating over the core containing a chelating agent selected from the group consisting of an alkali metal salt, an alkaline earth metal salt and mixtures thereof of a hydroxycarboxylic acid having the formula $$RC_nH_m(OH)_nCOOH$$

wherein R is $CH_2OH$, n is 2–6 and m is 0–n.

23. A method for bleaching an article, comprising contacting the article with an aqueous solution of a bleaching agent comprising particles as claimed in claim 22.

24. A composition comprising at least one of an inert filler and at least one substance active at washing, and particles as claimed in claim 22.

25. A method for preparing a particle comprising applying a coating over a core, the core comprising a peroxy compound having the capability of releasing hydrogen peroxide in aqueous solutions, the coating containing a chelating agent selected from the group consisting of an alkali metal salt, an alkaline earth metal salt and mixtures thereof of a hydroxycarboxylic acid having the formula $$RC_nH_m(OH)_nCOOH$$

wherein R is $CH_2OH$, n is 2–6 and m is 0–n.

26. Particles comprising mixture of a a peroxy compound capable of releasing hydrogen peroxide or peroxy acids in aqueous solutions, with alkali metal silicate and a chelating agent selected from the group consisting of an alkali metal salt, an alkaline earth metal salt and mixtures thereof of a hydroxycarboxylic acid having the formula $$RC_nH_m(OH)_nCOOH$$

wherein R is $CH_2OH$ or COOH, n is 4 or 5 and m is 0–n.

27. A method for preparing particles comprising mixing a peroxy compound capable of releasing hydrogen peroxide or peroxy acids in aqueous solution, with alkali metal silicate and a chelating agent selected from the group consisting of alkali metal salts, alkaline earth metal salts and mixtures thereof, of a hydroxycarboxylic acid having the formula $$RC_nH_m(OH)_nCOOH$$

wherein R is CH$_2$OH or COOH, n is 4 or 5 and m is 0–n.

28. A method for preparing a particle comprising applying a coating over a core, the core comprising a peroxy compound having the capability of releasing hydrogen peroxide in aqueous solutions, the coating containing alkali metal silicate and a chelating agent selected from the group consisting of an alkali metal salt, an alkaline earth metal salt and mixtures thereof of a hydroxycarboxylic acid having the formula $$RC_nH_m(OH)_nNCOOH$$

wherein R is CH$_2$OH or COOH, n is 2–6 and m is 0–n.

29. A method for preparing a particle comprising applying a coating over a core, the core comprising a peroxy compound having the capability of releasing hydrogen peroxide in aqueous solutions, the coating containing a chelating agent selected from the group consisting of an alkali metal salt, an alkaline earth metal salt and mixtures thereof of a hydroxycarboxylic acid having the formula $$RC_nH_m(OH)_nCOOH$$

wherein R is CH$_2$OH or COOH, n is 4 or 5 and m is 0–n.

* * * * *